US012607782B2

(12) United States Patent
Doshay et al.

(10) Patent No.: US 12,607,782 B2
(45) Date of Patent: Apr. 21, 2026

(54) AIR-GAP ENCAPSULATION OF NANOSTRUCTURED OPTICAL DEVICES

(71) Applicant: Applied Materials, Inc., Santa Clara, CA (US)

(72) Inventors: Sage Toko Garrett Doshay, Saratoga, CA (US); Kenichi Ohno, Sunnyvale, CA (US); Rutger Meyer Timmerman Thijssen, Sunnyvale, CA (US); Russell Chin Yee Teo, Palo Alto, CA (US); Jinrui Guo, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 722 days.

(21) Appl. No.: 17/354,667

(22) Filed: Jun. 22, 2021

(65) Prior Publication Data

US 2022/0011471 A1     Jan. 13, 2022

Related U.S. Application Data

(60) Provisional application No. 63/050,100, filed on Jul. 9, 2020.

(51) Int. Cl.
  G02B 1/00     (2006.01)
  C03C 15/00    (2006.01)
  (Continued)

(52) U.S. Cl.
  CPC ................ G02B 3/08 (2013.01); C03C 15/00 (2013.01); G02B 1/002 (2013.01); G02B 5/1809 (2013.01);
  (Continued)

(58) Field of Classification Search
  CPC .... G02B 1/002; G02B 5/1809; G02B 5/1871; G02B 5/1861–1866; G02B 5/1885; G02B 2207/101
  See application file for complete search history.

(56) References Cited

U.S. PATENT DOCUMENTS

| | | | |
|---|---|---|---|
| 8,638,490 B1 | 1/2014 | Payne | |
| 2007/0267057 A1 | 11/2007 | Haluzak et al. | |

(Continued)

FOREIGN PATENT DOCUMENTS

| | | |
|---|---|---|
| EP | 1416303 A2 | 5/2004 |
| JP | 2005517973 A | 6/2005 |

(Continued)

OTHER PUBLICATIONS

International Search Report/ Written Opinion issued to PCT/US2021/038460 on Oct. 13, 2021.

(Continued)

*Primary Examiner* — Bumsuk Won
*Assistant Examiner* — Samanvitha Sridhar
(74) *Attorney, Agent, or Firm* — Patterson + Sheridan, LLP

(57)     ABSTRACT

Embodiments described herein relate to encapsulated optical devices and methods of forming optical devices with controllable air-gapped encapsulation. In one embodiment, a plurality of openings are formed in a support layer surrounding the plurality of optical device structures to create a high refractive index contrast between the optical device structures, the support layer, and the openings. In another embodiment, sacrificial material is disposed in-between the optical device structures and then an encapsulation layer is disposed on the optical device structures. The sacrificial material is removed, forming a space bounded by the encapsulation layer, the substrate, and each of the optical device structures. In yet another embodiment, the encapsulation layer is disposed over the optical device structures forming a space bounded by the encapsulation layer, the substrate, and each of the optical device structures.

11 Claims, 11 Drawing Sheets

(51) Int. Cl.
    G02B 3/08         (2006.01)
    G02B 5/18         (2006.01)
(52) U.S. Cl.
    CPC ...... G02B 5/1871 (2013.01); G02B 2207/101
                           (2013.01)

(56)          References Cited

U.S. PATENT DOCUMENTS

| | | | |
|---|---|---|---|
| 2008/0152892 A1 | 6/2008 | Edlinger et al. | |
| 2010/0136792 A1* | 6/2010 | Mebarki | H01L 21/0337 |
| | | | 430/323 |
| 2015/0090862 A1* | 4/2015 | Matsui | G02B 5/1876 |
| | | | 359/356 |
| 2016/0308020 A1* | 10/2016 | Sreenivasan | G03F 7/0002 |
| 2017/0023807 A1 | 1/2017 | Chang-Hasnain et al. | |
| 2019/0154877 A1* | 5/2019 | Capasso | G02B 1/002 |
| 2020/0057182 A1 | 2/2020 | Zhan et al. | |
| 2020/0116900 A1* | 4/2020 | Chiu | G02B 5/1809 |
| 2020/0135703 A1* | 4/2020 | Ahmed | G02B 30/00 |
| 2021/0132256 A1* | 5/2021 | Park | G02B 1/002 |

FOREIGN PATENT DOCUMENTS

| | | |
|---|---|---|
| KR | 20190107116 A | 9/2019 |
| TW | 201639194 A | 11/2016 |
| TW | 201909451 A | 3/2019 |
| WO | 2016081476 | 5/2016 |
| WO | 2020006308 A1 | 1/2020 |

OTHER PUBLICATIONS

Japanese Office Action issued to patent application No. 2023-500301 on Mar. 12, 2024.
European Supplementary Search Report issued to patent application No. 21837508.7 on Jul. 4, 2024.
European Search Report issued to patent application No. 21837508.7 on Nov. 26, 2024.
China Office Action issued to patent application No. 202180047524.4 on May 31, 2025.
Taiwanese Office Action dated Mar. 18, 2025 for Application No. 110125132.

* cited by examiner

301

100

110

302

102

103

104

301

100

304

302

102

103

104

110

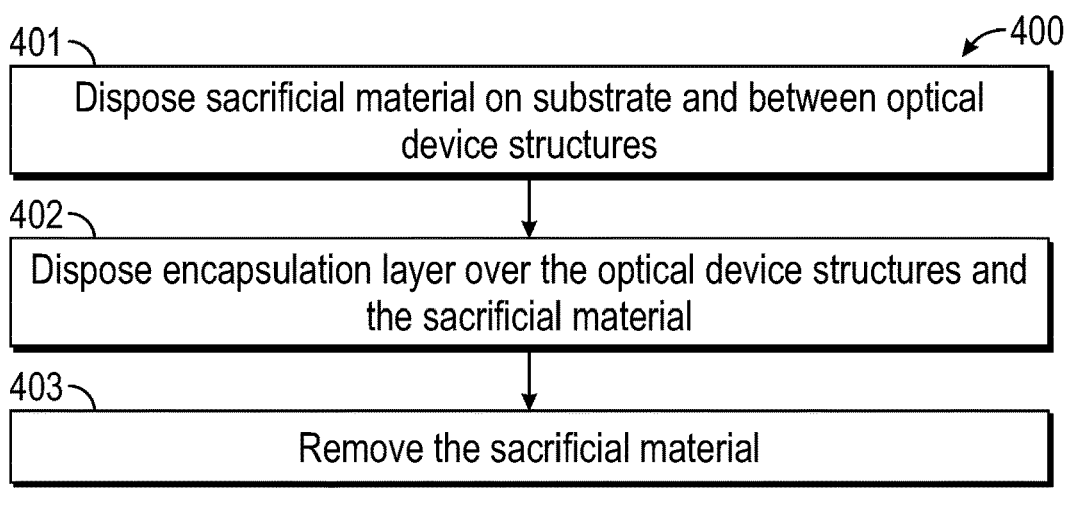
401 — Dispose sacrificial material on substrate and between optical device structures
402 — Dispose encapsulation layer over the optical device structures and the sacrificial material
403 — Remove the sacrificial material
FIG. 4
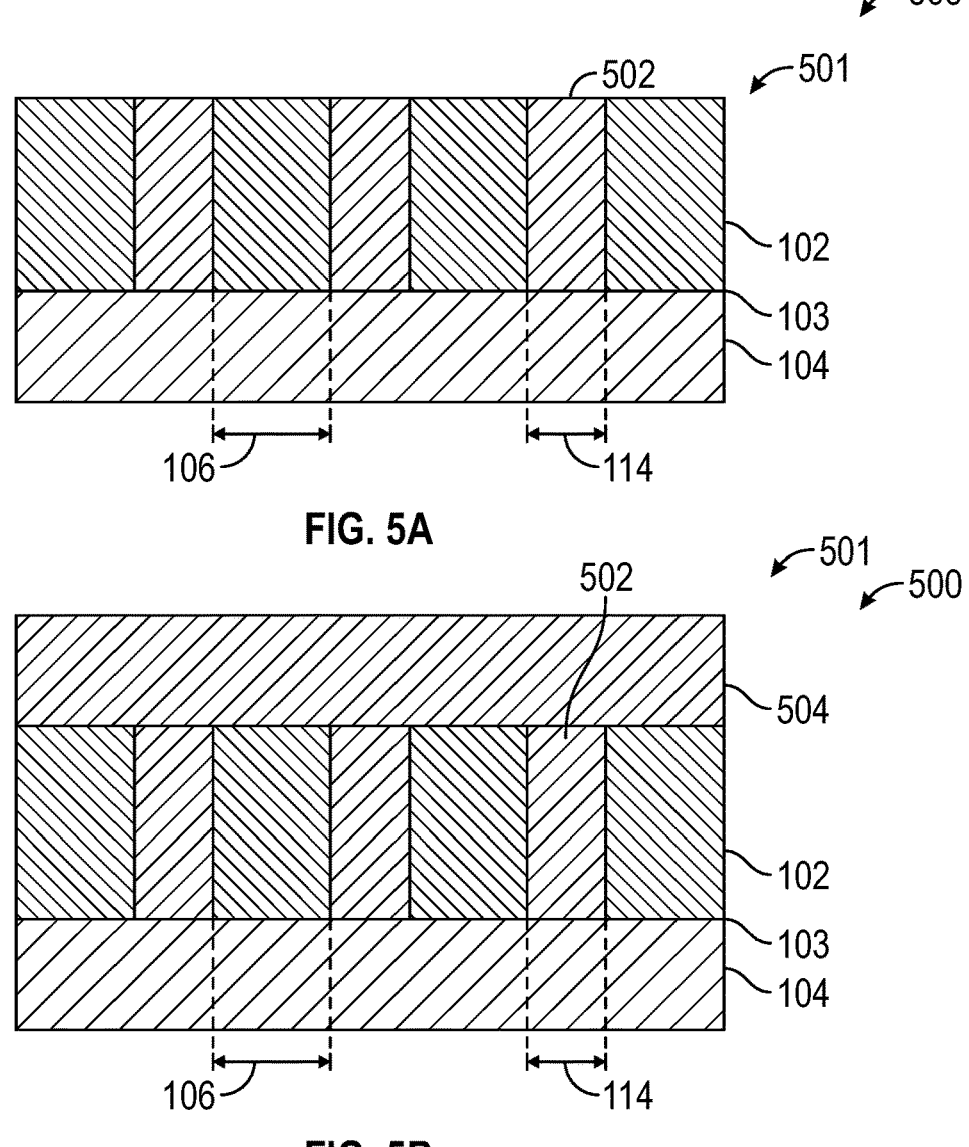
FIG. 5A
FIG. 5B

AIR-GAP ENCAPSULATION OF NANOSTRUCTURED OPTICAL DEVICES

CROSS-REFERENCE TO RELATED APPLICATIONS

This application claims the benefit of U.S. Patent Application No. 63/050,100, filed on Jul. 9, 2020, the contents of which are herein incorporated by reference.

BACKGROUND

Field

Embodiments of the present disclosure generally relate to optical devices. More specifically, embodiments described herein relate to encapsulated optical devices and methods of forming optical devices with controllable air-gapped encapsulation.

Description of the Related Art

Nano-structured optical devices include arrangements of structures with in-plane dimensions smaller than half a design wavelength of light. For example, the structures may have sub-micron dimensions, e.g., nanosized dimensions. Optical devices including waveguide combiners, such as augmented reality waveguides, or flat optical devices, such as metasurfaces, may consist of a single layer or multiple layers of such structures. The optical devices comprising such structures require encapsulation for mechanical protection. Encapsulation materials can also function as spacers between successive layers of a multilayer arrangement of optical structures. Additionally, the optical properties of encapsulating materials affect optical device performance. For example, a high contrast between the refractive index of the material of the structures and the refractive index of the material between the structures is desirable to improve the optical device performance. Air, having a refractive index of about 1.0, is a desirable material to be between the structures to improve the optical properties of the optical device. Therefore, what is needed in the art are encapsulated optical devices and methods of forming optical devices with controllable air-gapped encapsulation.

SUMMARY

In one embodiment an optical device is provided. The optical device includes a plurality of optical device structures disposed in or on a substrate. The optical device structures each have a critical dimension less than 2 microns corresponding to a width or a diameter of a cross section of optical device structures and a structure material having an optical device refractive index between about 1.7 and about 4.0. The plurality of optical device structures also includes a support layer surrounding each structure of the plurality of optical device structures. The support layer includes a support material having a support layer refractive index of about 1.0 to 1.6. A plurality of openings are disposed through the support layer. Each opening of the plurality of openings abuts two or more structures of the plurality of structures. The plurality of openings have a refractive index of about 1.0.

In another embodiment, a method is provided. The method includes disposing a support layer on a substrate and between a plurality of optical device structures. The support layer is planar with a first hardmask layer disposed on the plurality of optical device structures. The method further includes disposing a second hardmask layer over the support layer and the first hardmask layer and disposing a resist layer over the second hardmask layer. The method further includes exposing a pattern in the resist layer. The pattern exposes portions of the second hardmask layer, the pattern corresponding to an opening to be formed in the support layer. The method further includes etching the exposed portions of the second hardmask layer. The method further includes etching exposed portions of the support layer to form the opening therethrough. The method further includes removing the first hardmask layer and the second hardmask layer.

In another embodiment, a method is provided. The method includes disposing a sacrificial material on a substrate and between optical device structures of a plurality of optical device structures. The plurality of optical device structures include a critical dimension less than 2 microns corresponding to a width or a diameter of a cross section of optical device structures. The plurality of optical device structures include a structure material having an optical device refractive index between about 1.7 and about 4.0. The method further includes disposing an encapsulation layer over the plurality of optical device structures and the sacrificial material. The encapsulation layer includes an encapsulation material having an encapsulation refractive index of about 1.0 to about 1.6. The method further includes removing the sacrificial material with an etch process. The etch process includes an etch chemistry that etches the sacrificial material at a higher rate than the encapsulation layer, wherein the encapsulation layer, the substrate, and each of the optical device structures of the plurality of optical devices structures bound a space therebetween. The space has a refractive index of about 1.0.

In another embodiment, an optical device is provided. The optical device includes a plurality of optical device structures disposed in or on a substrate. The plurality of optical device structures include a critical dimension less than 2 microns corresponding to a width or a diameter of a cross section of optical device structures. The plurality of optical device structures include a structure material having an optical device refractive index between about 1.7 and about 4.0. The optical device further includes an encapsulation layer including an encapsulation refractive index of about 1.0 to about 1.6. The encapsulation layer includes first portions of a first material. The first portions surround a top surface of the plurality of optical device structures. The first portions of the first material include gaps defined between the first portions. The encapsulation layer further includes second portions of a second material at least disposed in the gaps, wherein the encapsulation layer, the substrate, and each of the optical device structures of the plurality of optical devices structures bound a space therebetween. The space has a refractive index of about 1.0.

In yet another embodiment, a method is provided. The method includes disposing first portions of an encapsulation layer. The first portions of the encapsulation layer surround a top surface of a plurality of optical device structures. The plurality of optical device structures are disposed in or on a substrate and the plurality of optical device structures include a critical dimension less than 2 microns corresponding to a width or a diameter of a cross section of optical device structures. The plurality of optical device structures include a structure material having an optical device refractive index between about 1.7 and about 4.0. The first portions of the encapsulation layer include a first material with a first refractive index of about 1.0 to about 1.6. The first portions of the encapsulation layer include gaps defined between the first portions of the encapsulation layer. The method further includes disposing second portions of the encapsulation layer in at least the gaps between the first portions of the encapsulation layer. The second portions include a second material having a second refractive index of about 1.0 to about 1.6. The first portions and the second portions, the substrate, and the plurality of optical device structures bound a space therebetween and the space has a refractive index of about 1.0.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 4 is a flow diagram of a method of forming an optical device according to embodiments described herein.

FIGS. 5A-5E are schematic, cross-sectional views of a substrate during operations of a method of forming an optical device according to embodiments described herein.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices. More specifically, embodiments described herein relate to optical devices and methods of forming optical devices.

One embodiment includes a plurality of optical device structures disposed in or on a substrate. The optical device structures each have a critical dimension less than 2 microns corresponding to a width or a diameter of a cross section of optical device structures. The plurality of optical device structures include a structure material having an optical device refractive index between about 1.7 and about 4.0. The plurality of optical device structures also includes a support layer surrounding each structure of the plurality of optical device structures. The support layer includes a support material having a support layer refractive index of about 1.0 to 1.6. A plurality of openings are disposed through the support layer. Each opening of the plurality of openings abuts two or more structures of the plurality of structures. The plurality of openings having a refractive index of about 1.0. A refractive index contrast is created between optical device structures, the support layer, and the openings.

In another embodiment, sacrificial material is disposed in between the optical device structures and then an encapsulation layer is disposed on the optical device structures and sacrificial material. The sacrificial material is removed, forming a space bounded by the encapsulation layer, the substrate, and each of the optical device structures. Thus, there is a contrast between the refractive index of the structure material, the refractive indexes of the encapsulation material, and the refractive index of the space, including air with a refractive index of 1.0.

In yet another embodiment, first portions of the encapsulation layer and second portions of the encapsulation layer are disposed over the optical device structures forming a space bounded by the encapsulation layer, the substrate, and each of the optical device structures. Thus, there is a refractive index contrast between the space, the optical device structures, the encapsulation layer, and the substrate.

Figure 1A:
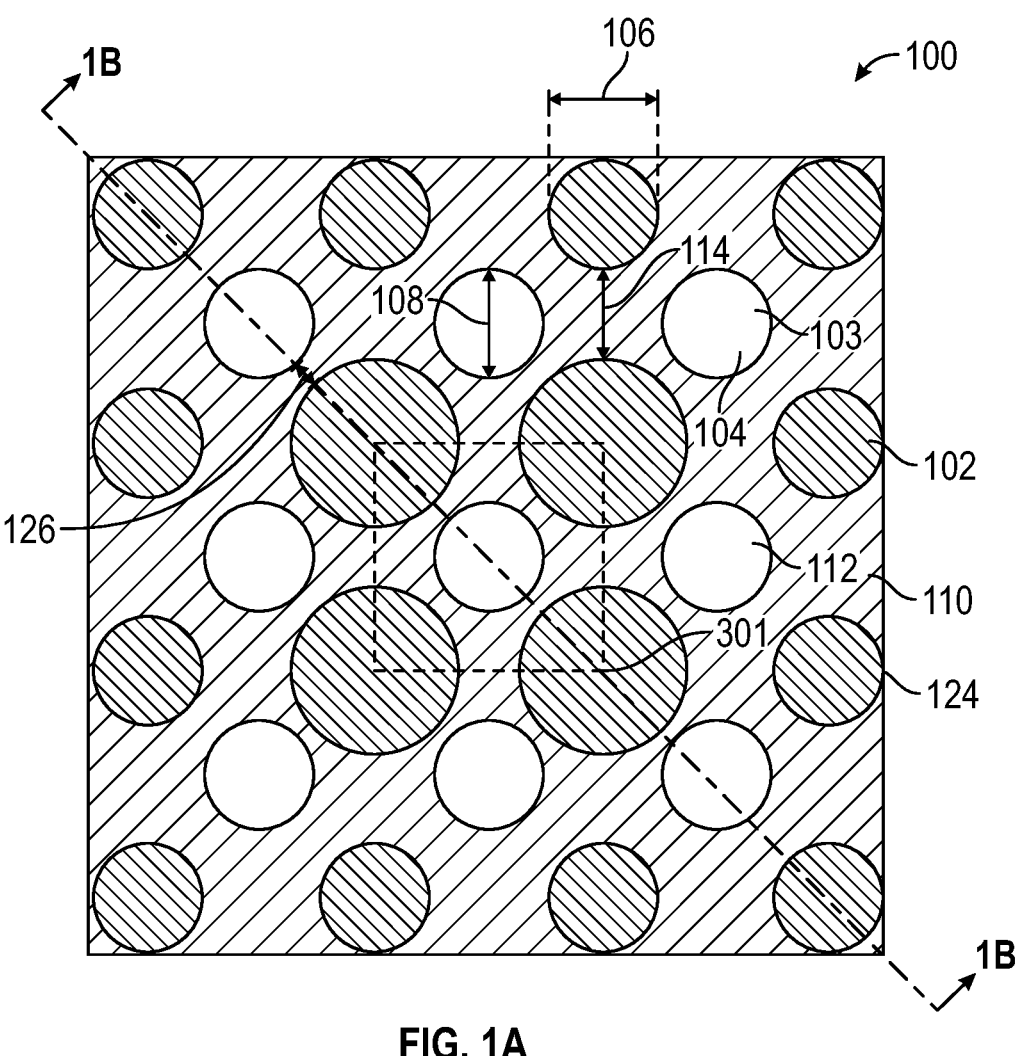
FIG. 1A is a schematic, top view of an optical device according to embodiments described herein.
Figure 1B:
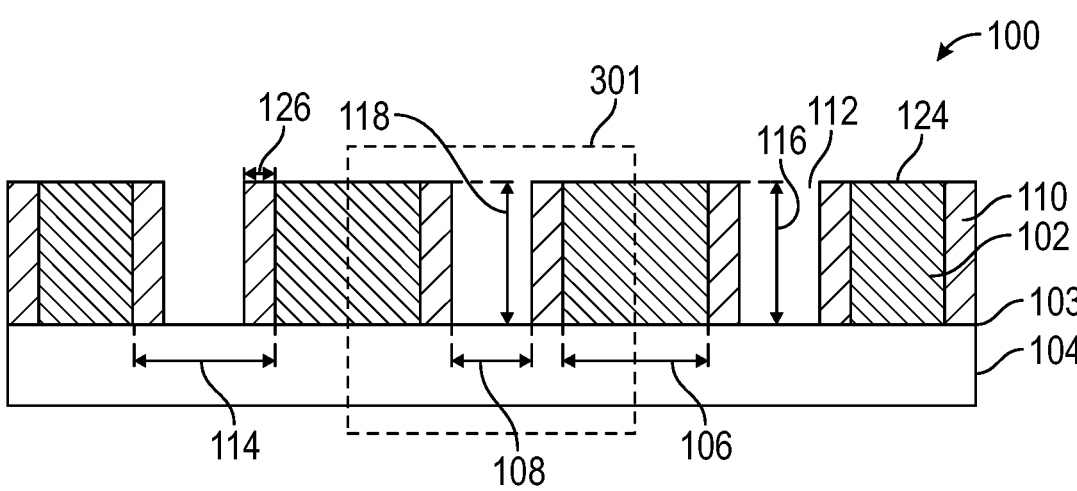
FIG. 1B is a schematic, cross-sectional view of an optical device according to embodiments described herein.

FIG. 1A is a schematic top view and FIG. 1B is a schematic cross-sectional view of an optical device 100. In some embodiments, which can be combined with other embodiments described herein, the optical device 100 is a flat optical device, such as a metasurface. In other embodiments, which can be combined with other embodiments described herein, the optical device 100 is a waveguide combiner, such as augmented reality waveguide combiners. Embodiments described herein provide for an optical device 100 that includes a plurality of optical device structures 102 disposed in or on a surface 103 of substrate 104. In one embodiment, which can be combined with other embodiments described herein, the plurality of optical device structures 102 are nanostructures, having sub-micron dimensions, e.g., nano-sized dimensions. In another embodiment, which can be combined with other embodiments described herein, the plurality of optical device structures 102 are sub-wavelength structures.

The optical device structures 102 have critical dimensions 106, e.g., one of the width or the diameter of the optical device structures 102. In one embodiment, which may be combined with other embodiments described herein, the critical dimension 106 is less than 2 micrometers ($\mu$m). In one embodiment, which may be combined with other embodiments described herein, the critical dimensions 106 are about 100 nanometers (nm) to about 1000 nm. The plurality of optical device structures include a structure material having an optical device refractive index between about 1.7 and about 4.0.

While FIGS. 1A and 1B depict the optical device structures 102 as having circular cross-sections, the cross-sections of the optical device structures 102 may have other shapes including, but not limited to, rectangular, triangular, elliptical, regular polygonal, irregular polygonal, and/or irregular shaped cross-sections. In some embodiments, which can be combined with other embodiments described herein, the cross-sections of the optical device structures 102 of the optical device 100 have different shaped cross-sections. In other embodiments, which can be combined with other embodiments described herein, the cross-sections of the optical device structures 102 of the optical device 100 have cross-sections with substantially the same shape. In some embodiments, which can be combined with other embodiments described herein, at least one of the critical dimensions 106 of an optical device structure 102 may be different from the other critical dimensions 106 of the optical device structures 102. In other embodiments, which can be combined with other embodiments described herein, the critical dimensions 106 of the optical device structure 102 are the same.

The substrate 104 may also be selected to transmit a suitable amount of light of a desired wavelength or wavelength range, such as one or more wavelengths from about 100 μm to about 8000 μm. Without limitation, in some embodiments, the substrate 104 is configured such that the substrate 104 transmits greater than or equal to about 50% to about 100%, of an infrared to ultraviolet region of the light spectrum. The substrate 104 may be formed from any suitable material, provided that the substrate 104 can adequately transmit light in a desired wavelength or wavelength range and can serve as an adequate support for the optical device 100 described herein. In some embodiments, which can be combined with other embodiments described herein, the material of the substrate 104 has a refractive index that is relatively low, as compared to the refractive index of the structure material of the plurality of optical device structures 102. Substrate selection may include substrates of any suitable material, including, but not limited to, amorphous dielectrics, non-amorphous dielectrics, crystalline dielectrics, silicon oxide, silicon carbide, polymers, or combinations thereof. In some embodiments, which may be combined with other embodiments described herein, the substrate 104 includes a transparent material. In one embodiment, which may be combined with other embodiments described herein, the substrate 104 is transparent with absorption coefficient smaller than 0.001. Suitable examples may include an oxide, sulfide, phosphide, telluride or combinations thereof. In one example, the substrate 104 includes silicon (Si), silicon dioxide ($SiO_2$), silicon carbide (SiC), germanium (Ge), silicon germanium (SiGe), InP, GaAs, GaN, fused silica, quartz, sapphire, or high-index transparent materials such as high-refractive-index glass.

In one embodiment, which may be combined with other embodiments described herein, the structure material of the optical device structures 102 includes non-conductive materials, such as dielectric materials. The dielectric materials may include amorphous, polycrystalline, or crystalline materials. Examples of the dielectric materials include, but are not limited to, silicon-containing materials, such as Si, silicon nitride ($Si_3N_4$), silicon oxynitride, or silicon dioxide. The silicon may be crystalline silicon, polycrystalline silicon, or amorphous silicon (a-Si). In another embodiment, which may be combined with other embodiments described herein, the structure material of the optical device structures 102 includes, but is not limited to, titanium dioxide ($TiO_2$), zinc oxide (ZnO), tin dioxide ($SnO_2$), aluminum-doped zinc oxide (AZO), fluorine-doped tin oxide (FTO), cadmium stannate ($Cd_2SnO_4$), cadmium stannate (tin oxide) (CTO), zinc stannate ($SnZnO_3$), tantalum oxide ($Ta_2O_5$), vanadium (IV) oxide ($VO_x$), or niobium oxide ($Nb_2O_5$) containing materials. In yet another embodiment, which can be combined with other embodiments described herein, the material of the optical device structures 102 includes nanoimprint resist materials. Examples of nanoimprint resist materials include, but are not limited to, at least one of spin on glass (SOG), flowable SOG, organic, inorganic, and hybrid (organic and inorganic) nanoimprintable materials that may contain at least one of silicon oxycarbide (SiOC), $TiO_2$, silicon dioxide ($SiO_2$), vanadium (IV) oxide ($VO_x$), aluminum oxide ($Al_2O_3$), indium tin oxide (ITO), ZnO, tantalum oxide ($Ta_2O_5$), silicon nitride ($Si_3N_4$), titanium nitride (TiN), zirconium dioxide ($ZrO_2$) containing materials, combinations thereof, or other suitable materials.

In one embodiment, which may be combined with other embodiments described herein, the optical device structures 102 may be formed by one of ion-beam etching, reactive ion etching, electron-beam (e-beam) etching, wet etching, nano-imprint lithography (NIL), or combinations thereof.

The plurality of optical device structures 102 are surrounded by a support layer 110. The support layer 110 provides a mechanical support for the plurality of optical device structures 102. The mechanical support of the plurality of optical device structures 102 may allow stacking of additional layers of optical device structures 102. The support layer 110 includes a support material that has a refractive index of about 1.0 to about 1.5. In one embodiment, which can be combined with other embodiments described herein, the support material includes, but is not limited to, $SiO_2$, low-k, SiOC, SiCONH, borophosphosilicate glass (BPSG), phosphosilicate glass (PSG), or $Si_3N_4$ materials. The support layer 110 is disposed in the gaps 114 between adjacent optical device structures 102. In some embodiments, which can be combined with other embodiments described herein, two or more gaps 114 are different from each other. In other embodiments, which can be combined with other embodiments described herein, the gaps 114 are equal or substantially equal between the plurality of optical device structures 102. The support layer 110 has a plurality of openings 112 disposed therethrough. Each opening of the plurality of openings 112 has a critical dimension 108 corresponding to a width or a diameter of the openings 112. The critical dimension 108 may be about 0.1 nm to about 4000 nm. In some embodiments, which can be combined with other embodiments described, at least one of the critical dimensions 108 of an opening 112 may be different from the critical dimensions of the other openings 112. In other embodiments, which can be combined with other embodiments described herein, the critical dimensions 108 of the openings 112 are the same. The support layer 110 surrounding an optical device structure 102 has a thickness 126. The thickness 126 may be about 0.1 nm to about 1000 nm.

The support layer 110 has a support layer height 118. In one embodiment, which may be combined with other embodiments described herein, the plurality of optical device structures 102 have a structure height 116 that is planar with the support layer height 118. In another embodiment, which may be combined with other embodiments described herein, the structure height 116 is not equal to the support layer height 118. In one embodiment, which may be combined with other embodiments described herein, the support layer 110 may be disposed over a top surface 124 of the plurality of optical device structures 102. In another embodiment, which may be combined with other embodiments described herein, the support layer 110 is not in contact with the top surface 124 of the plurality of optical device structures 102, as shown in FIG. 1B. In yet another embodiment, which can be combined with other embodiments described herein, the support layer 110 may be disposed over a top surface 124 of the plurality of optical device structures 102 and disposed over the plurality of openings 112.

It is desirable to have a large contrast between refractive indices of the structure material of the plurality of optical device structures 102 and the surrounding structures including the substrate 104, the support material of the support layer 110, and the air of the plurality of openings 112. Thus, it is desirable to form a plurality of openings 112, the plurality of openings 112 including air with a refractive index of about 1.0, such that there is a contrast of refractive indices present between the structure material and the plurality of openings 112. Increasing the contrast of refractive indices of the materials forming the optical device 100 described herein enables the use of a reduced thickness of the materials and reduces the thickness of the optical device 100.

Figure 2:
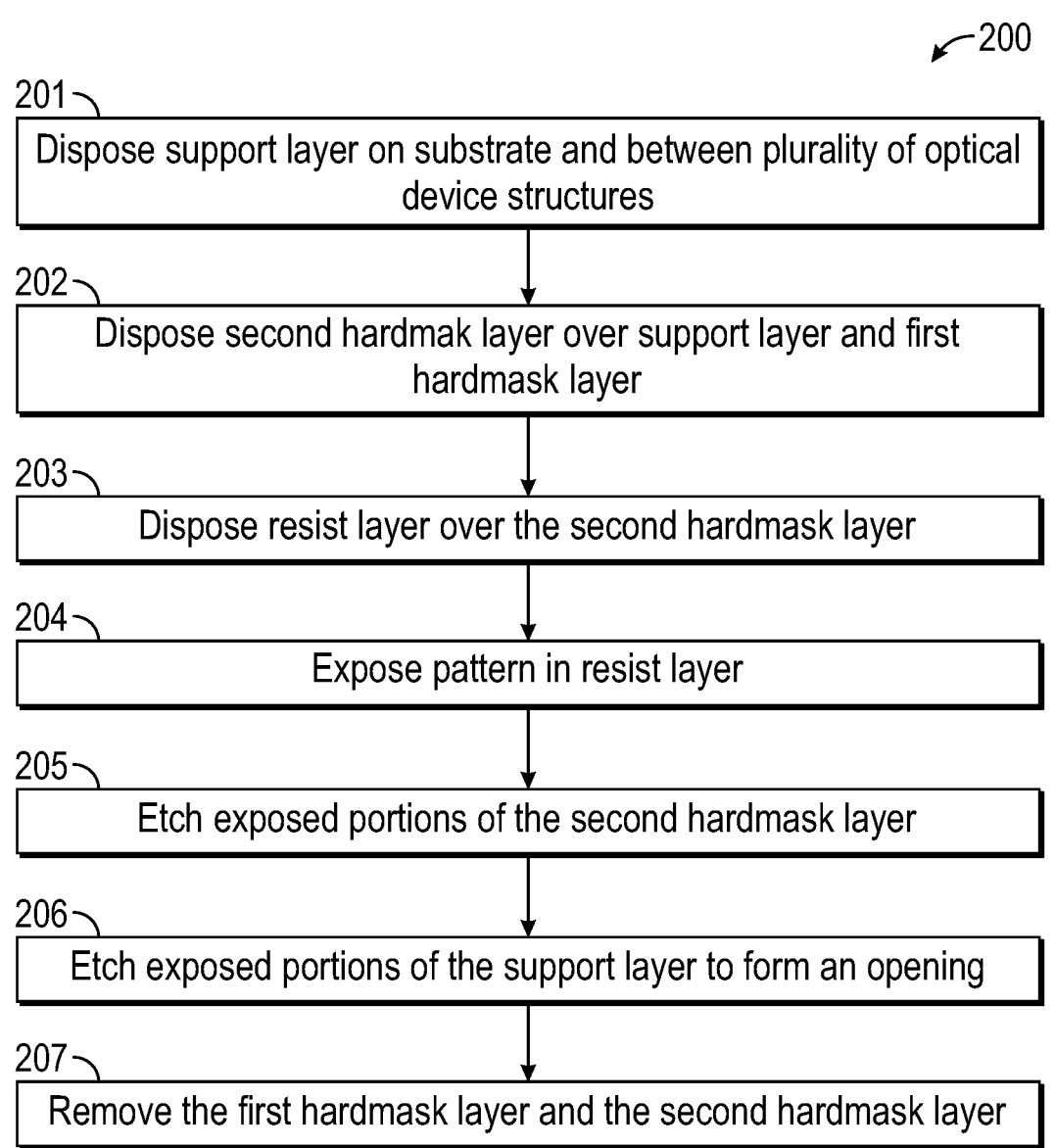
FIG. 2 is a flow diagram of a method of forming an optical device according to embodiments described herein.

FIG. 2 is a flow diagram of a method 200 for forming an optical device 100, as shown in FIGS. 3A-3J. FIGS. 3A-3J are schematic, perspective views of a portion 301 of a substrate 104 during the method 200. In one embodiment, which can be combined with other embodiments described herein, the portion 301 may correspond to a portion or a whole surface of the substrate 104 of an optical device 100. In another embodiment, which can be combined with other embodiments described herein, the portion 301 may correspond to a unit cell of the optical device 100.

Figure 3A:
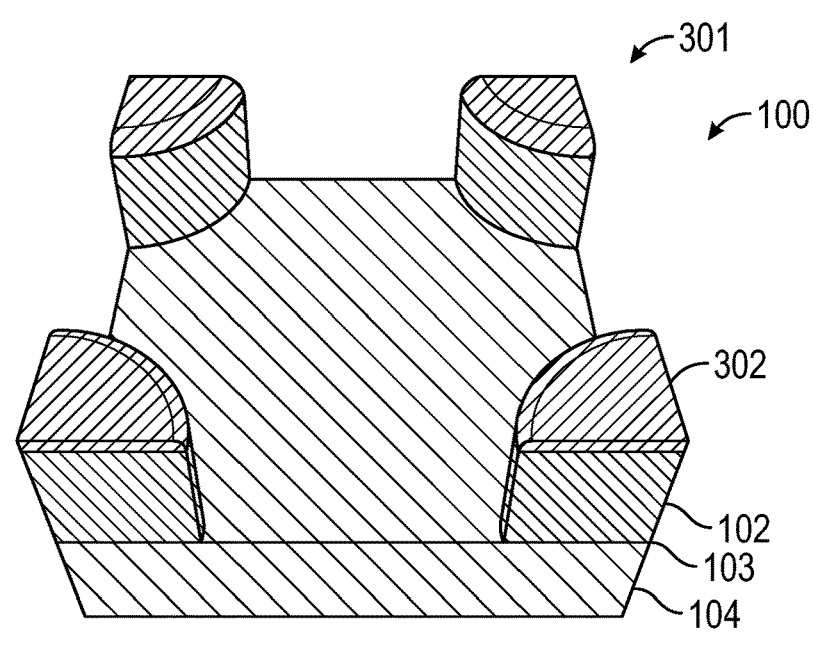
FIGS. 3A-3J are schematic, perspective views of a substrate during operations of a method of forming an optical device according to embodiments described herein.
Figure 3B:
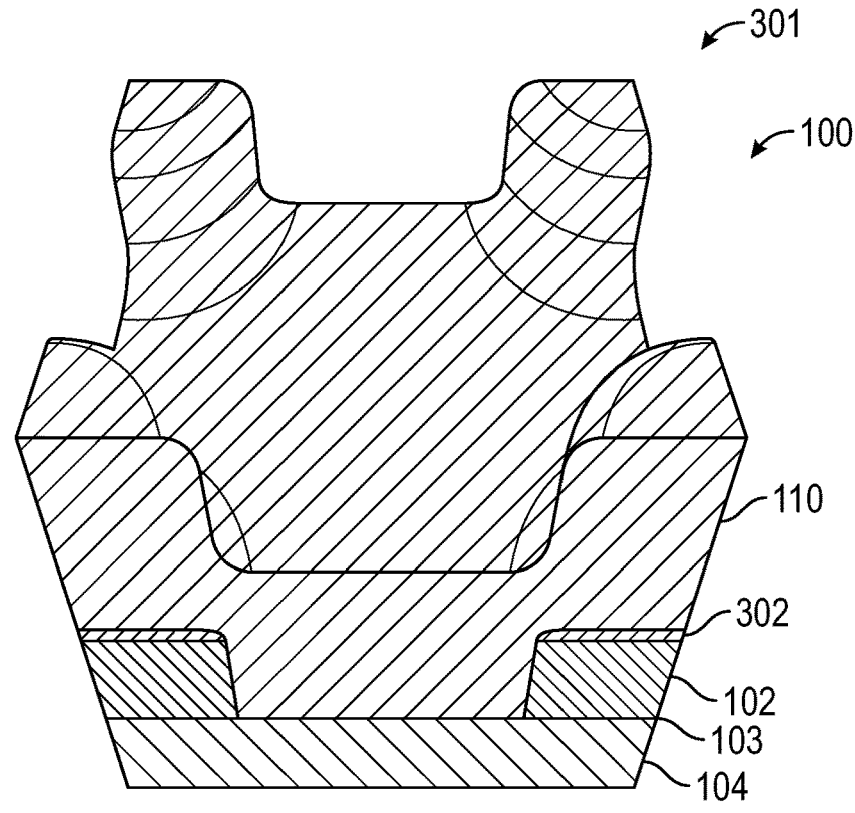
Figure 3C:
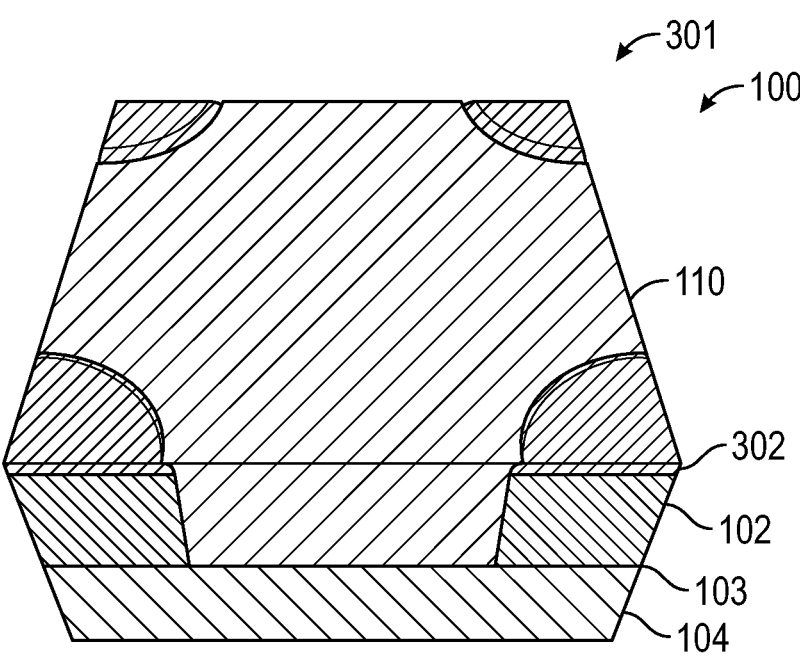

At operation 201, as shown in FIGS. 3A-3C, a support layer 110 is disposed on a surface 103 of the substrate and between a plurality of optical device structures 102. The surface 103 of substrate 104 has the plurality of optical device structures 102 disposed thereon. Prior to operation 201, a first hardmask layer 302 is disposed over each of the plurality of optical devices structures 102. The support layer 110 may be deposited by one or more of chemical vapor deposition (CVD), physical vapor deposition (PVD), atomic layer deposition (ALD), multi-beam-epitaxy (MBE), ion-beam-assisted-deposition (IBAD), epitaxy, spin-on-glass (SoG) or spin-on-coat (SoC) processes, or any other suitable processes. In one embodiment, which can be combined with other embodiments described herein, at operation 201, as shown in FIG. 3B, the support layer 110 is conformal to the optical device structures 102. As shown in FIG. 3C, the support layer 110 may be planarized such that the support layer 110 is planar to the first hardmask layer 302. The support layer 110 may be planarized by an etching or chemical-mechanical polishing (CMP) process.

Figure 3D:
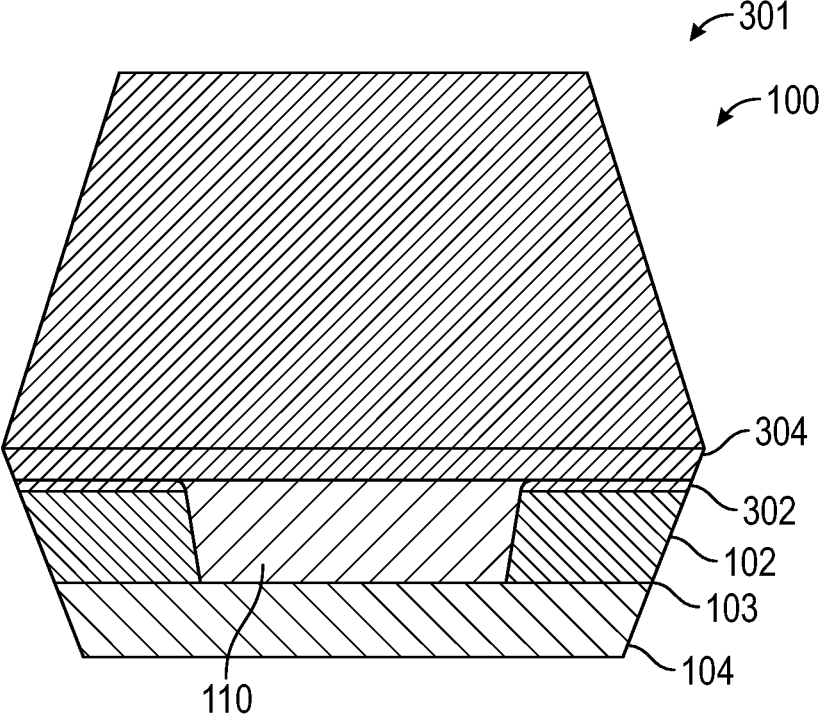

At operation 202, as shown in FIG. 3D, a second hardmask layer 304 is disposed over the support layer 110 and the first hardmask layer 302. In one embodiment, which can be combined with other embodiments described herein, the first hardmask layer 302 and the second hardmask layer 304 include a hardmask material that includes but is not limited to, silicon nitride (SiN), SiO, low-k, SiOC, SiCONH, TaO, dielectrics, metallic alloys such as TiN, combinations thereof, or other suitable materials.

Figures 3E, 3F:
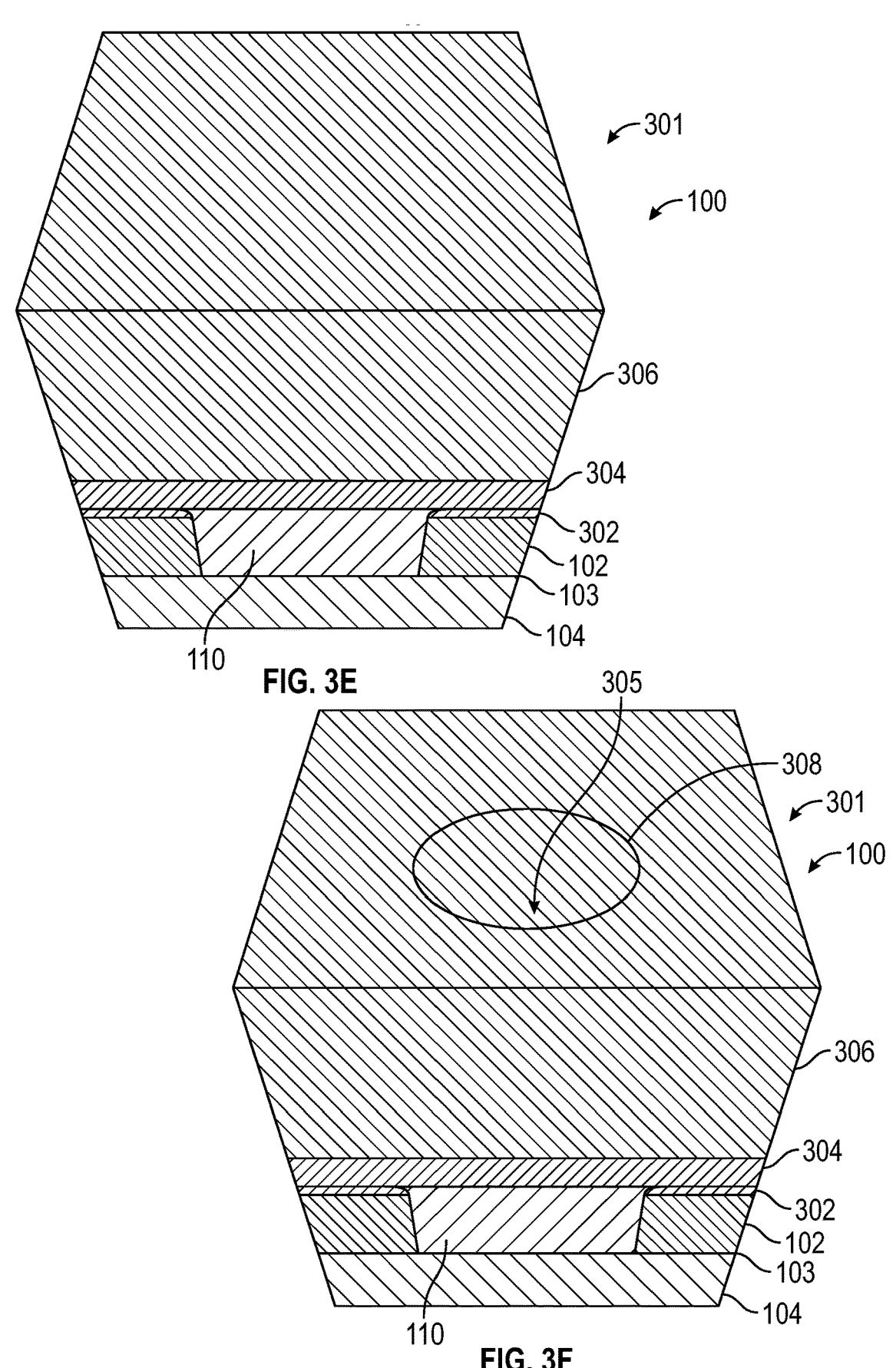

At operation 203, as shown in FIG. 3E, a resist layer 306 is disposed over the second hardmask layer 304. In one embodiment, which may be combined with other embodiments described herein, the resist layer 306 is a three layer stack including an organic planarization layer, an antireflective coating layer, and a photoresist layer. The organic planarization layer is disposed over the second hardmask layer 304, the antireflective coating layer is disposed over the organic planarization layer and the photoresist layer is disposed over the antireflective coating layer.

At operation 204, as shown in FIG. 3F, a pattern 308 is exposed in the resist layer 306. The pattern 308 exposes exposed portions 305 of the second hardmask layer 304. The exposed portions 305 may be accessed through the pattern 308 formed in the resist layer 306. In one embodiment, which may be combined with other embodiments described herein, the pattern 308 is exposed utilizing a lithography process. In another embodiment, which can be combined with other embodiments described herein, the resist layer 306 is imprinted in a NIL process. The pattern 308 corresponds to the pattern of the plurality of openings 112 to be formed in the support layer 110 abutting two or more of the optical device structures 102.

Figure 3G:
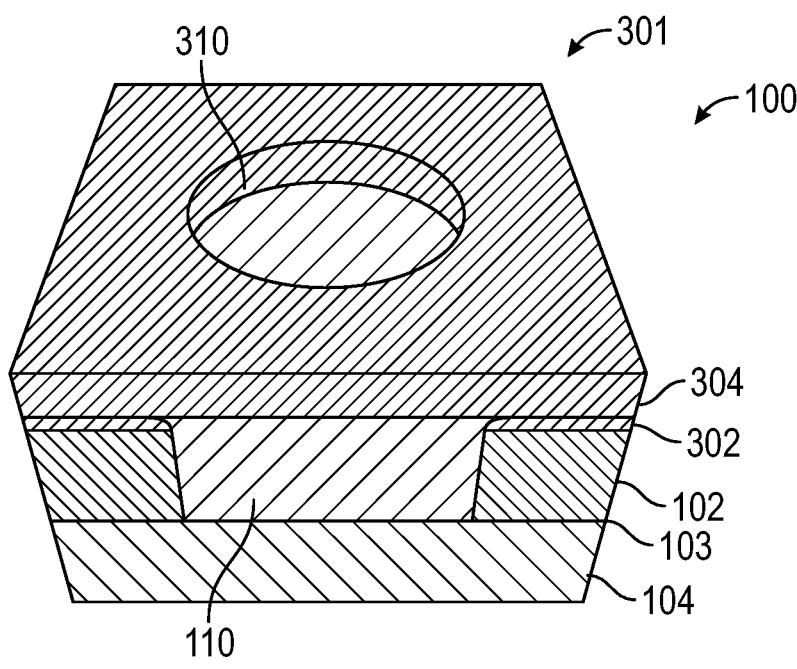

At operation 205, the exposed portions 305 of the second hardmask layer 304 are etched. In one embodiment, which can be combined with other embodiments described herein, the resist layer 306 may be removed during the operation 205 as the exposed portions 305 are etched. As shown in FIG. 3G, exposed portions 310 of the support layer 110 are formed when the exposed portions 305 of the second hardmask layer 304 are removed. In one embodiment, which can be combined with other embodiments described herein, the exposed portions 305 of the second hardmask layer 304 are removed via an ashing, isotropic wet bench clean strip, reactive-ion-ech (RIE), or anisotropic strip process. The exposed portions 310 of the support layer 110 correspond to the plurality of openings 112 of the optical device pattern of the support layer 110.

Figure 3H:
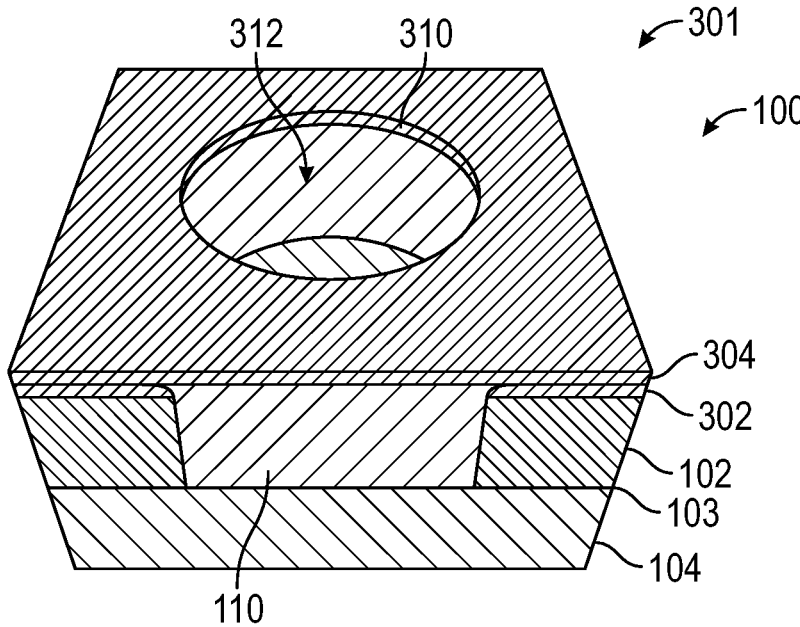
Figure 3I:
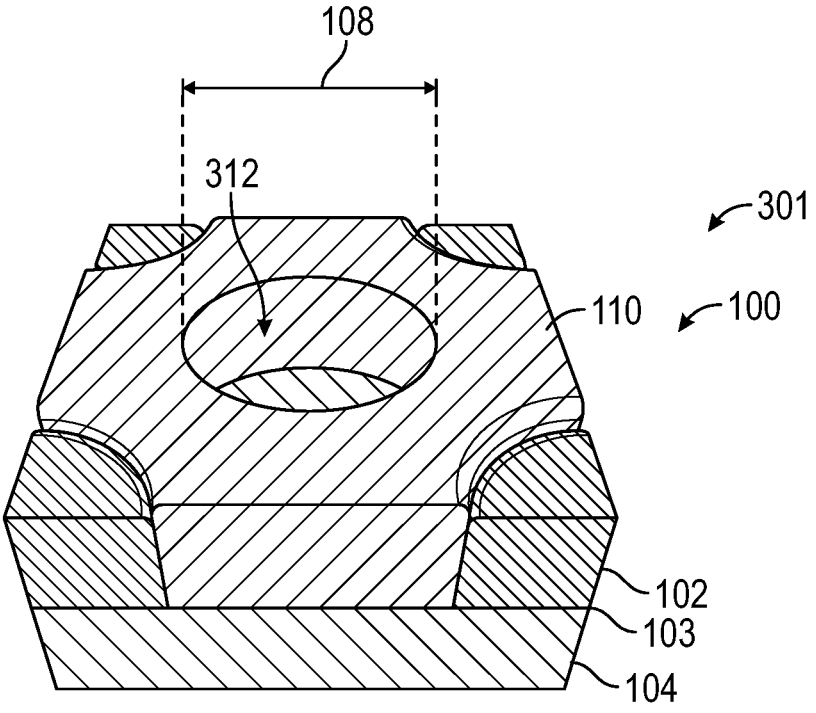

At operation 206, as shown in FIG. 3H, the exposed portions 310 of the support layer 110 are etched. The support layer 110 is subjected to a wet etch process to form an opening 312 of a plurality of openings 312. In one embodiment, which can be combined with other embodiments described herein, the resist layer 306 may be removed during the operation 205 as the exposed portions 310 are etched. At operation 207, as shown in FIG. 3I, the second hardmask layer 304 and the first hardmask layer 302 are removed.

Figure 3J:
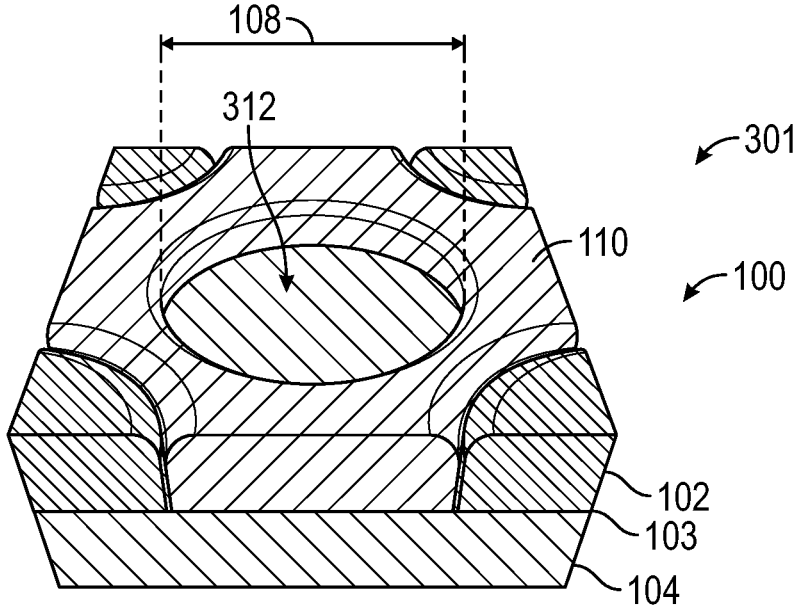

In one embodiment, which can be combined with other embodiments described herein, as shown in FIG. 3J, the opening 312 of a plurality of openings 112 may be enlarged. The enlarging of the opening 312 increases the critical dimension 108. The opening 312 is enlarged by at least one of a wet etch or SRP process. The opening 312 is enlarged to improve the refractive index contrast between the opening 312 and a structure material of the plurality of optical device structures 102. The opening 312 with air disposed therein, has a refractive index of about 1.0 and the structure material has a refractive index between about 1.7 and about 4.0. Thus, there is a contrast between the refractive index of the structure material, a support material of the support layer 110, and the openings. In one embodiment, the contrast of the refractive index of the structure material to the support material refractive index is about 1.2 to about 3.8.

FIG. 4 is a flow diagram of a method 400 of forming an optical device 500. FIGS. 5A-5E are schematic, cross-sectional views of a portion 501 of a substrate 104 during the method 400. In one embodiment, which can be combined with other embodiments described herein, the portion 501 may correspond to a portion or a whole surface of the substrate 104 of an optical device 500 that has the plurality of optical device structures 102 formed thereon.

At operation 401, as shown in FIG. 5A, a sacrificial material 502 is disposed on a surface 103 of a substrate 104 and between optical device structures 102 of a plurality of optical device structures 102. The sacrificial material 502 is disposed in gaps 114 during the operation 401. The gaps 114 are disposed between each of the optical device structures 102. In some embodiments, which can be combined with other embodiments described herein, two or more gaps 114 are different from each other. In other embodiments, which can be combined with other embodiments described herein, the two or more gaps 114 are equal or substantially equal between the plurality of optical device structures 102.

In one embodiment, which can be combined with other embodiments described herein, the sacrificial material 502 is deposited by CVD, hot-wire CVD (HWCVD), PECVD, inductively coupled (ICPCVD), FCVD, ALD, MBE, PVD, SoG, SoC, or ion-beam-assisted-deposition (IBAD). The plurality of optical device structures 102 include a structure material having an optical device refractive index between about 1.7 and about 4.0. The plurality of optical device structures 102 have a critical dimension 106 corresponding to a width or a diameter of a cross-section of optical device structures 102. In one embodiment, which may be combined with other embodiments described herein, the critical dimension 106 is less than 2 μm and corresponds to the width or the diameter of the optical device structures 102, depending on the cross-section of the optical device structures 102. In one embodiment, which may be combined with other embodiments described herein, the critical dimensions 106 are about 100 nanometers (nm) to about 1000 nm.

Figure 5C:
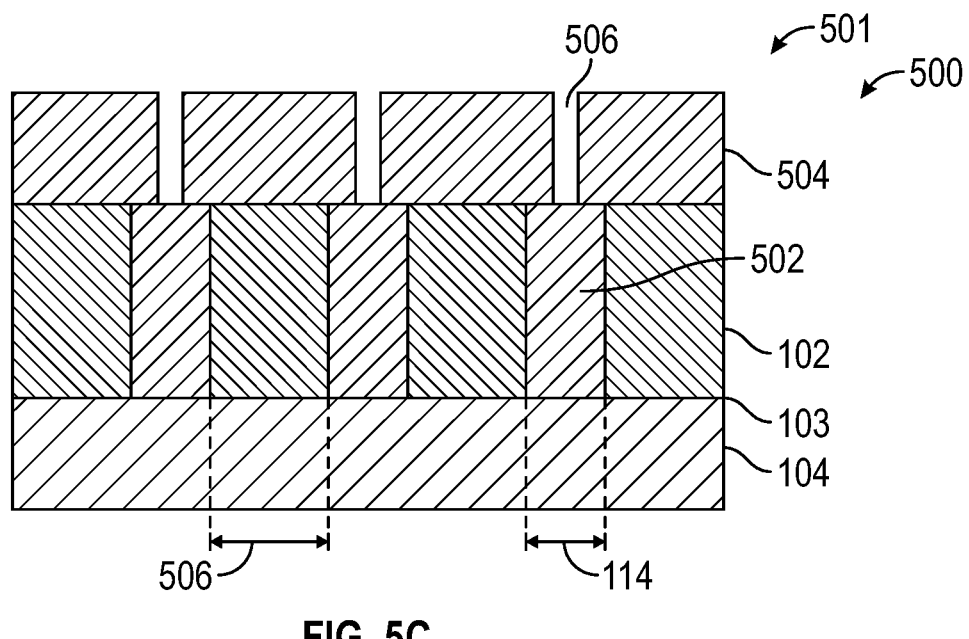

At operation 402, as shown in FIG. 5B, an encapsulation layer 504 is disposed over the plurality of optical device structures 102 and the sacrificial material 502. The encapsulation layer 504 includes an encapsulation material having an encapsulation refractive index between about 1.0 and about 1.6. The encapsulation layer 504 is a mechanically robust layer to assist in assembly and to protect the optical device structures 102 from environmental exposure. Additionally, the encapsulation layer 504 may improve the optical performance of the optical device 500 or improve other aspects of the optical device 500. As shown in FIG. 5C, in one embodiment, which may be combined with other embodiments described herein, a plurality of openings 506 are formed through the encapsulation layer 504 to the gaps 114. The plurality of openings 506 provide an opening for removal of the sacrificial material 502.

Figure 5D:
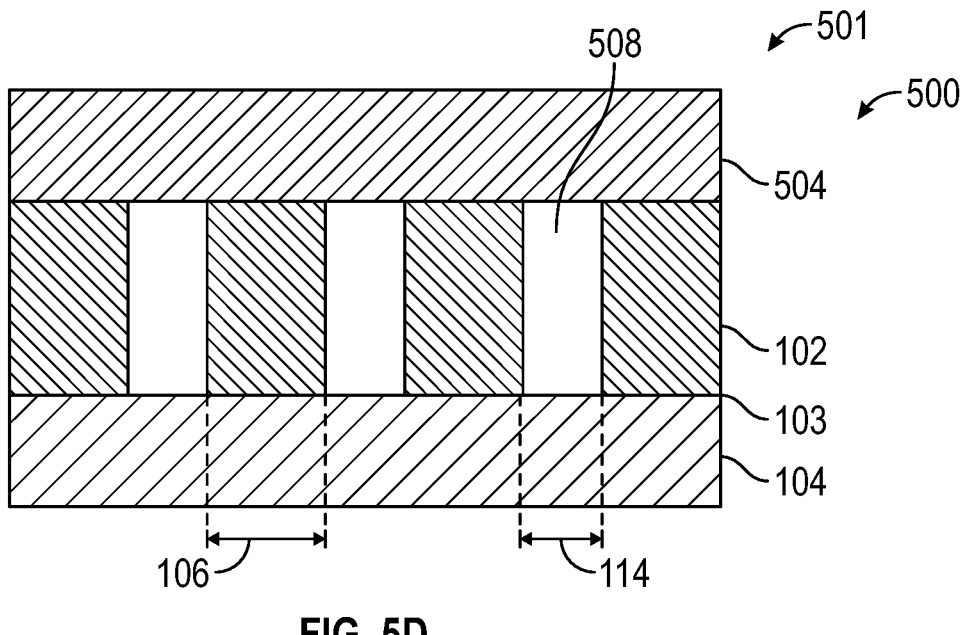

At operation 403, as shown in FIG. 5D, the sacrificial material 502 is selectively removed from the gap 114 at a higher rate than the encapsulation layer 504 is removed. In one embodiment, which may be combined with other embodiments described herein, the sacrificial material is wet etched, isotropically wet stripped, RIE, or anisotropically stripped. In another embodiment, which can be combined with other embodiments described herein, the sacrificial material is removed via thermal annealing.

Figure 5E:
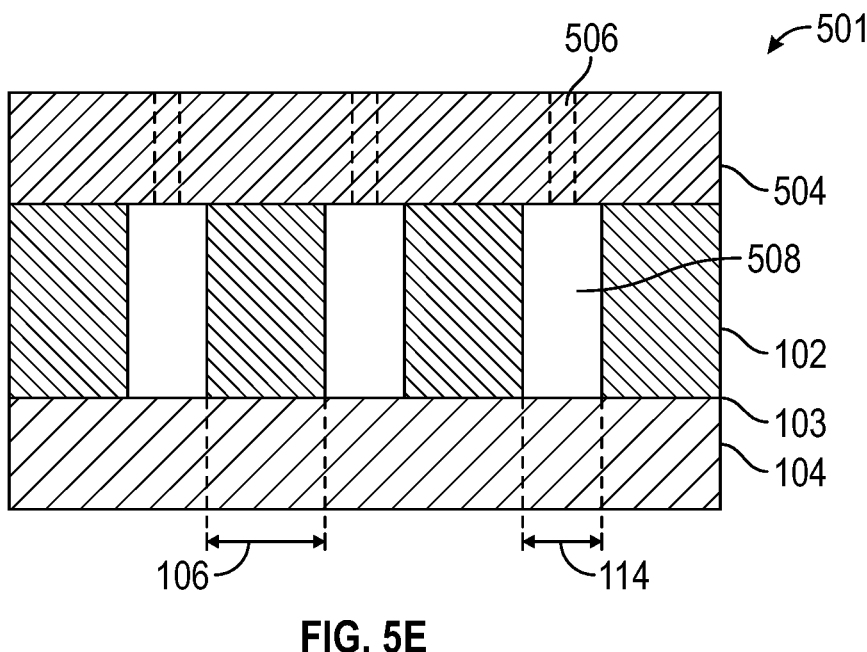

As shown in FIGS. 5D and 5E, the encapsulation layer 504, the substrate 104, and each of the optical device structures 102 of the plurality of optical device structures 102 bound a space 508. The space 508, including air disposed therein has a refractive index of about 1.0. Thus, there is a contrast between the refractive index of the structure material, the refractive index of the encapsulation material, and the refractive index of the air, having a refractive index of 1.0. As shown in FIG. 5E, in embodiments utilizing the plurality of openings 506 to expose the sacrificial material 502 to etchants, the plurality of openings 506 are filled with material after the sacrificial material 502 is removed.

In one embodiment, which may be combined with other embodiments described herein, once the optical device structures 102 have been encapsulated by encapsulation layer 504, a second layer of optical device structures 102 may be formed on the encapsulation layer 504. For example, following fabrication of additional optical device structures, the additional optical device structures may be formed on the encapsulation layer 504 such that the method 400 may be repeated to form a multi-layered optical device 500.

Figure 6:
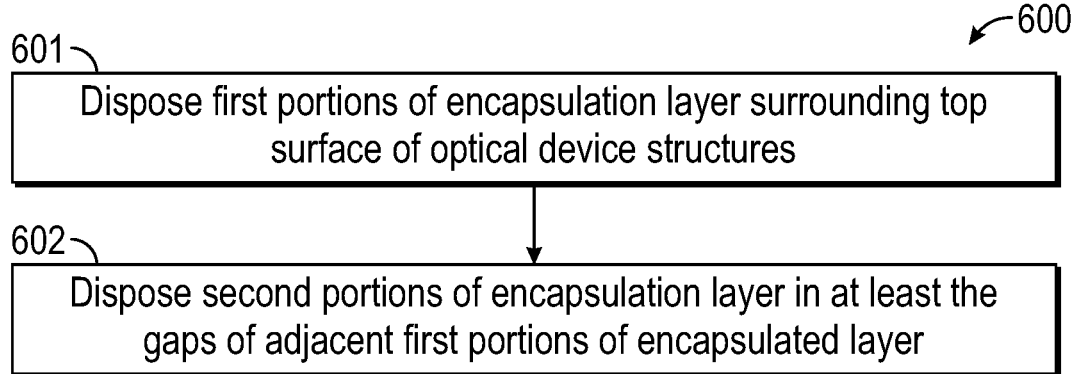
FIG. 6 is a flow diagram of a method of forming an optical device according to embodiments described herein.
Figure 7A:
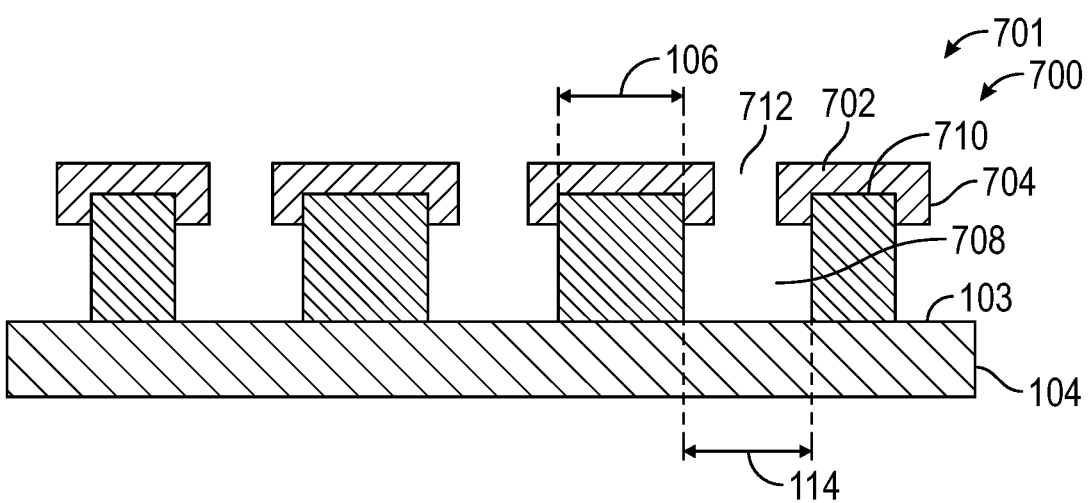
FIGS. 7A-7C are schematic, cross-sectional views of a substrate during operations of a method of forming an optical device according to embodiments described herein.
Figure 7B:
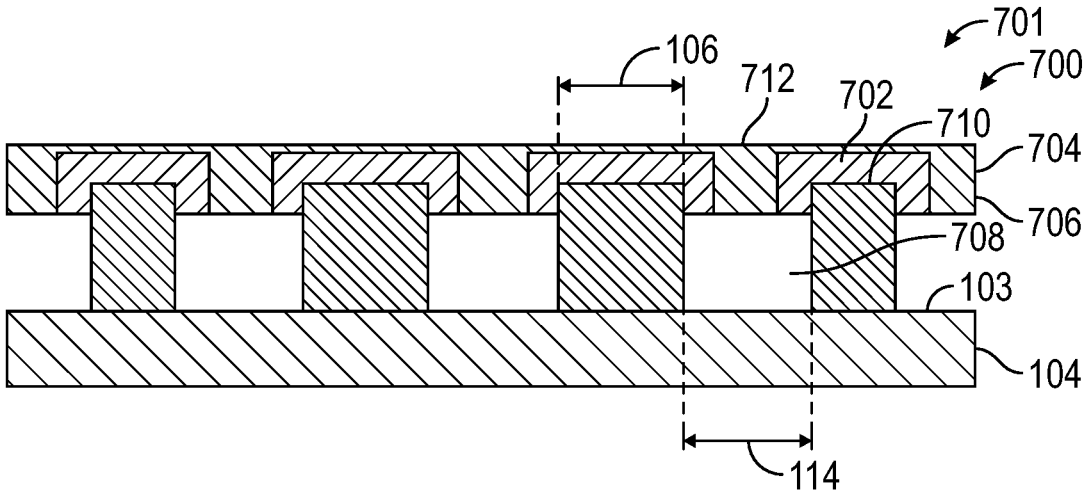
Figure 7C:
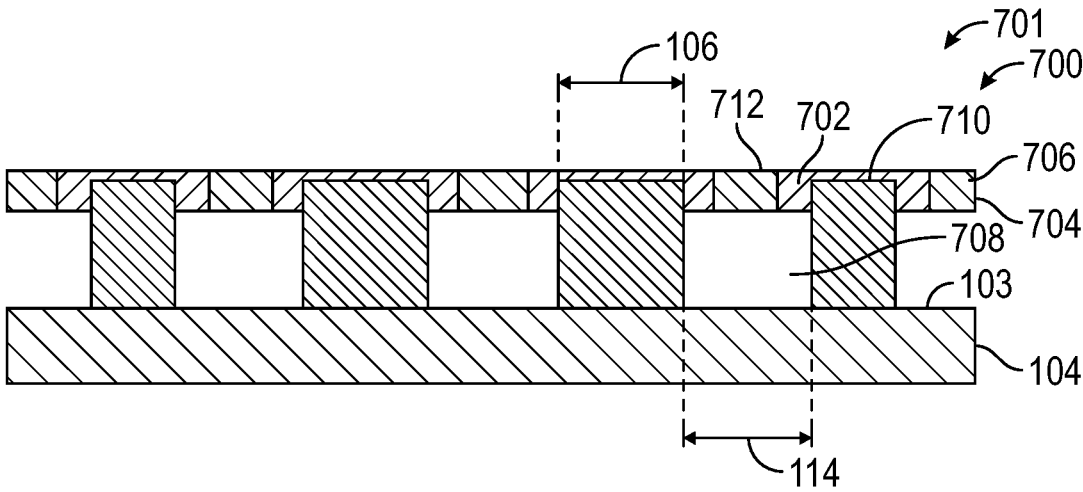

FIG. 6 is a flow diagram of a method 600 for forming an optical device 700. FIGS. 7A-7C are schematic, cross-sectional views of a portion 701 of a substrate 104 during the method 600. In one embodiment, which can be combined with other embodiments described herein, the portion 701 may correspond to a portion or a whole surface of the substrate 104 of an optical device 700 that has the plurality of optical device structures 102 formed thereon.

At operation 601, as shown in FIG. 7A, first portions 702 of an encapsulation layer 704 are disposed on a top surface 710 of a plurality of optical device structures 102. The first portions 702 of the encapsulation layer 704 are surrounding the top surface 710 of the plurality of optical device structures 102. The first portions 702 of the encapsulation layer 704 include an encapsulation material having a first refractive index of about 1.0 to about 1.6. In one embodiment, which may be combined with other embodiments described herein, the first portions 702 are deposited using a high-density plasma. The first portions 702 of the encapsulation layer 704 may be conformal to the top surface 710 of the plurality of optical device structures 102.

The first portions 702 may include, but are not limited to, SiN, low-k, SiOC, SiCONH, SiO, PSG, BPSG, TaO, TiN materials, combinations thereof, or other suitable materials. The first portions 702 may be disposed by CVD, FCVD, ALD, MBE, PVD, SoG, SoC, epitaxy, or IBAD. The plurality of optical device structures 102 are disposed on a surface 103 of a substrate 104. The plurality of optical device structures 102 include a structure material having a refractive index between about 1.7 and about 4.0. In one embodiment, which may be combined with other embodiments described herein, the critical dimension 106 is less than 2 μm and corresponds to the width or the diameter of the optical device structures 102, depending on the cross-section of the optical device structures 102. In one embodiment, which may be combined with other embodiments described herein, the critical dimensions 106 are about 100 nm to about 1000 nm. In some embodiments, which can be combined with other embodiments described herein, gaps 114 are disposed between each of the optical device structures 102. A gap 712 is also disposed between adjacent first portions 702 of the encapsulation layer 704. In some embodiments, which can be combined with other embodiments described herein, two or more gaps 114, 712 are different from each other. In other embodiments, which can be combined with other embodiments described herein, the two or more gaps 114,712 are equal or substantially equal between the plurality of optical device structures 102.

At operation 602, as shown in FIG. 7B, second portions 706 of the encapsulation layer 704 are disposed in at least the gaps 114 of the first portions 702 of the encapsulation layer 704. The second portions 706 of the encapsulation layer 704 include the encapsulation material having a second refractive index of about 1.0 to about 1.6. In one embodiment, which may be combined with other embodiments described herein, the second portions 706 are deposited using an atomic layer deposition process. The encapsulation layer 704 including the first portions 702 and second portions 706, the substrate 104, and each of the optical device structures 102 of the plurality of optical device structures 102 bound a space 708. The space has a refractive index of about 1.0. Thus, there is a contrast between the refractive index of the structure material, the first and second refractive indexes of the encapsulation material, and the refractive index of the space 708.

As shown in FIG. 7C, in one embodiment, which may be combined with other embodiments described herein, the first portions 702 and second portions 706 of the encapsulation layer 704 are made planar to one another via a chemical-mechanical polishing process or a RIE process. The chemical-mechanical polishing process or a RIE process may also thin the encapsulation layer 704.

In one embodiment, which may be combined with other embodiments described herein, once the optical device structures 102 have been encapsulated by encapsulation layer 704, a second layer of optical device structures 102 may be formed on the encapsulation layer 704. For example, following fabrication of additional optical device structures, the additional optical device structures may be formed on the encapsulation layer 704 such that the method 600 may be repeated to form a multi-layered optical device 700.

In summation, encapsulated optical devices and methods of forming optical devices with controllable air-gapped encapsulation are described herein. In one embodiment, a plurality of openings are formed in a support layer surrounding the plurality of optical device structures to create a high refractive index contrast between the optical device structures, the support layer, and the openings. In another embodiment, sacrificial material is disposed in between the optical device structures and then an encapsulation layer is disposed on the optical device structures. The sacrificial material is removed, forming a space bounded by the encapsulation layer, the substrate, and each of the optical device structures. Thus, a high refractive index contrast is created between the space, the optical device structures, the encapsulation layer, and the substrate. In yet another embodiment, the encapsulation layer is disposed over the optical device structures forming a space bounded by the encapsulation layer, the substrate, and each of the optical device structures. Thus, a high refractive index contrast is created between the space, the optical device structures, the encapsulation layer, and the substrate.

While the foregoing is directed to examples of the present disclosure, other and further examples of the disclosure may be devised without departing from the basic scope thereof, and the scope thereof is determined by the claims that follow.

What is claimed is:

1. An optical device comprising:
a plurality of optical device structures disposed in or on a surface of a substrate, wherein each structure of the plurality of optical device structures comprises:
a critical dimension less than 2 microns corresponding to a width or a diameter of a cross section of each structure; and
a structure material having an optical device refractive index between about 1.7 and about 4.0; and
a support layer in contact with the surface of the substrate, wherein the support layer surrounds each optical device structure of the plurality of optical device structures along the surface of the substrate, the support layer comprising:
a support material having a support layer refractive index of about 1.0 to about 1.5; and
a plurality of openings that extend through the support layer to the surface of the substrate, the plurality of openings having a refractive index of about 1.0, wherein:
the support layer is only disposed between the plurality of optical device structures, and
a height of the support layer is different from a structure height of the plurality of optical device structures.

2. The optical device of claim 1, wherein the support layer height is greater than the structure height.

3. The optical device of claim 1, wherein the optical device structures comprise one or more of titanium dioxide (TiO$_2$), zinc oxide (ZnO), tin dioxide (SnO$_2$), niobium oxide (Nb$_2$O$_5$), aluminum-doped zinc oxide (AZO), titanium nitride (TiN), and zirconium dioxide (ZrO$_2$), indium tin oxide (ITO), tantalum pentoxide (Ta$_2$O$_5$), fluorine-doped tin oxide (FTO), vanadium (IV) oxide, aluminum oxide (Al$_2$O$_3$), cadmium stannate (Cd$_2$SnO$_4$), cadmium stannate (tin oxide) (CTO), zinc stannate (tin oxide) (SnZnO$_3$), silicon, silicon nitride (Si$_3$N$_4$), silicon oxycarbide (SiOC), silicon oxynitride (SiON), or silicon dioxide (SiO$_2$).

4. An optical device comprising:
a plurality of optical device structures distributed along a surface of a substrate, wherein each structure of the plurality of optical device structures comprises:
a critical dimension less than 2 microns corresponding to a width or a diameter of a cross section of each structure; and
a structure material having an optical device refractive index between about 1.7 and about 4.0; and
a support layer in contact with the surface of the substrate, wherein the support layer surrounds each optical device structure of the plurality of optical device structures along the surface of the substrate, the support layer comprising:
a support material having a support layer refractive index of about 1.0 to about 1.5; and
a plurality of openings that extend through the support layer to the surface of the substrate, wherein each of the plurality of openings has a refractive index of about 1.0;
wherein a height of the support layer is greater than a height of the plurality of optical device structures, and
wherein the support layer is only disposed between the plurality of optical device structures.

5. The optical device of claim 4, wherein the optical device structures comprise one or more of titanium dioxide (TiO$_2$), zinc oxide (ZnO), tin dioxide (SnO$_2$), niobium oxide (Nb$_2$O$_5$), aluminum-doped zinc oxide (AZO), titanium nitride (TiN), and zirconium dioxide (ZrO$_2$), indium tin oxide (ITO), tantalum pentoxide (Ta$_2$O$_5$), fluorine-doped tin oxide (FTO), vanadium (IV) oxide, aluminum oxide (Al$_2$O$_3$), cadmium stannate (Cd$_2$SnO$_4$), cadmium stannate (tin oxide) (CTO), zinc stannate (tin oxide) (SnZnO$_3$), silicon, silicon nitride (Si$_3$N$_4$), silicon oxycarbide (SiOC), silicon oxynitride (SiON), or silicon dioxide (SiO$_2$).

6. The optical device of claim 4, wherein the support material includes SiO$_2$, low-k, SiOC, SiCONH, borophosphosilicate glass (BPSG), phosphosilicate glass (PSG), or Si$_3$N$_4$ materials.

7. The optical device of claim 4, wherein the substrate includes silicon (Si), silicon dioxide (SiO2), silicon carbide (SiC), germanium (Ge), silicon germanium (SiGe), InP, GaAs, GaN, fused silica, quartz, or sapphire.

8. The optical device of claim 4, wherein the substrate includes amorphous dielectrics, non-amorphous dielectrics, crystalline dielectrics, silicon dioxide, silicon carbide, polymers, or combinations thereof.

9. The optical device of claim 1, wherein the support material includes SiO$_2$, low-k, SiOC, SiCONH, borophosphosilicate glass (BPSG), phosphosilicate glass (PSG), or Si$_3$N$_4$ materials.

10. The optical device of claim 1, wherein the substrate includes silicon (Si), silicon dioxide (SiO2), silicon carbide (SiC), germanium (Ge), silicon germanium (SiGe), InP, GaAs, GaN, fused silica, quartz, or sapphire.

11. The optical device of claim 1, wherein the substrate includes amorphous dielectrics, non-amorphous dielectrics, crystalline dielectrics, silicon dioxide, silicon carbide, polymers, or combinations thereof.

* * * * *